(12) United States Patent
Saito

(10) Patent No.: US 10,863,058 B2
(45) Date of Patent: Dec. 8, 2020

(54) IMAGE PROCESSING DEVICE, DISPLAY DEVICE, AND IMAGE PROCESSING METHOD

(71) Applicant: SEIKO EPSON CORPORATION, Tokyo (JP)

(72) Inventor: Makoto Saito, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/690,373

(22) Filed: Nov. 21, 2019

(65) Prior Publication Data

US 2020/0169647 A1    May 28, 2020

(30) Foreign Application Priority Data

Nov. 22, 2018   (JP) .................................. 2018-218993

(51) Int. Cl.
*H04N 5/067* (2006.01)
*H04N 5/06* (2006.01)
*G03B 21/20* (2006.01)

(52) U.S. Cl.
CPC ............. *H04N 5/06* (2013.01); *G03B 21/206* (2013.01); *G03B 21/2013* (2013.01); *G03B 21/2033* (2013.01); *G03B 21/2053* (2013.01)

(58) Field of Classification Search
CPC ............ H04N 5/06; H04N 5/067; H04N 7/00; H04N 5/445; H04N 5/50; G03B 21/2013; G03B 21/2033; G03B 21/2053; G03B 21/206
USPC .................................. 348/521, 522, 552, 569
See application file for complete search history.

(56) References Cited

U.S. PATENT DOCUMENTS

| 7,289,168 B2* | 10/2007 | Yoshizawa | ......... H04N 5/44513 348/738 |
| 7,667,774 B2* | 2/2010 | Murakami | ............. H04N 5/268 348/500 |
| 8,345,160 B2* | 1/2013 | Nishio | ..................... H04N 5/06 348/518 |
| 8,643,782 B2* | 2/2014 | Hayashi | ................... H04N 5/06 348/521 |

(Continued)

FOREIGN PATENT DOCUMENTS

| JP | H10-304272 A | 11/1998 |
| JP | 2006-343500 A | 12/2006 |
| JP | 2016-24296 A | 2/2016 |

*Primary Examiner* — Trang U Tran
(74) *Attorney, Agent, or Firm* — Dority & Manning, P.A.

(57) ABSTRACT

An image processing device includes: a first processing unit generating third image information about a third image which is a combined image of a first image and a second image, by using first image information about the first image and second image information about the second image, and outputting a first signal including the third image information synchronously with a first synchronization signal; a second processing unit outputting a second signal including the second image information, switching between a first state where the second signal is synchronized with the first synchronization signal and a second state where the second signal is synchronized with a second synchronization signal different from the first synchronization signal, based on a state of the input first synchronization signal; and an output unit having the first signal and the second inputted and selecting and outputting the first signal or the second signal.

15 Claims, 9 Drawing Sheets

(56) References Cited

U.S. PATENT DOCUMENTS

| | | | | |
|---|---|---|---|---|
| 8,994,787 | B2* | 3/2015 | Fukuyama | H04N 13/183 |
| | | | | 348/42 |
| 9,912,844 | B2* | 3/2018 | Chen | G09G 5/18 |
| 2006/0279709 | A1 | 12/2006 | Yamamoto | |
| 2010/0253840 | A1* | 10/2010 | Nave | G09G 5/005 |
| | | | | 348/500 |

* cited by examiner

IMAGE PROCESSING DEVICE, DISPLAY DEVICE, AND IMAGE PROCESSING METHOD

The present application is based on, and claims priority from JP Application Serial Number 2018-218993, filed Nov. 22, 2018, the disclosure of which is hereby incorporated by reference herein in its entirety.

BACKGROUND

1. Technical Field

The present disclosure relates to an image processing device, a display device, and an image processing method.

2. Related Art

A display device having a so-called on-screen display (OSD) function is known. For example, an image projection device described in JP-A-2016-24296 combines together R light, G light, and B light passing through three liquid crystal panels for R, G, and B and projects the combined light from a projection lens, thus displaying a color image on a screen. The liquid crystal panels are driven, based on an RGB signal inputted via an input selector circuit. A menu image signal for displaying a menu screen as a graphical user interface (GUI) projected and displayed by the OSD function is added to the RGB signal when necessary. This addition is performed, based on a synchronization signal synchronized with the RGB signal.

However, in the image projection device described in JP-A-2016-24296, when the synchronization signal fluctuates or the like, the circuit on the subsequent stage cannot normally process the menu image signal due to a timing difference. This poses a problem in that an inconvenience such as tearing occurs.

SUMMARY

An image processing device according to an aspect of the disclosure includes: a first processing unit generating third image information about a third image which is a combined image of a first image and a second image, by using first image information about the first image and second image information about the second image included in an input signal, and outputting a first signal including the third image information synchronously with a first synchronization signal included in the input signal; a second processing unit outputting a second signal including the second image information, switching between a first state where the second signal is synchronized with the first synchronization signal and a second state where the second signal is synchronized with a second synchronization signal different from the first synchronization signal, based on a state of the first synchronization signal; and an output unit having the first signal and the second signal inputted and selecting and outputting the first signal or the second signal.

A display device according to another aspect of the disclosure includes: the image processing device according to the foregoing aspect; and a display unit displaying an image, using the first signal or the second signal outputted from the output unit.

An image processing method according to another aspect of the disclosure includes: generating third image information about a third image which is a combined image of a first image and a second image, by using first image information about the first image and second image information about the second image included in an input signal, and outputting a first signal including the third image information synchronously with a first synchronization signal included in the input signal; outputting a second signal including the second image information, switching between a first state where the second signal is synchronized with the first synchronization signal and a second state where the second signal is synchronized with a second synchronization signal different from the first synchronization signal, based on a state of the first synchronization signal; and selecting and outputting the first signal or the second signal.

DESCRIPTION OF EXEMPLARY EMBODIMENTS

Figure 1:
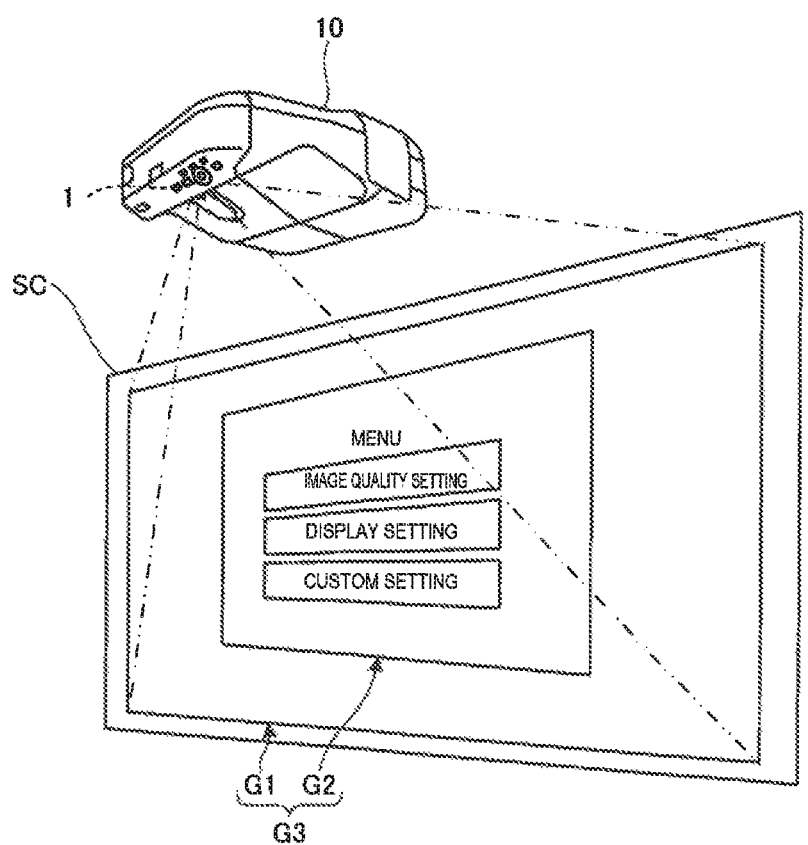
FIG. 1 is a perspective view showing a display device according to an embodiment.

A preferred embodiment according to the disclosure will now be described with reference to the accompanying drawings. In the drawings, the dimension and scale of each part are different from the actual dimension and scale where appropriate, and some parts are schematically shown in order to facilitate understanding. The scope of the disclosure is not limited to the embodiment unless there is any particular description below that limits the disclosure.

1. OUTLINE OF DISPLAY DEVICE

FIG. 1 is a perspective view showing a display device 10 according to an embodiment. The display device 10 is a projector which displays, on a screen SC, a first image G1 based on image information from an external device not illustrated in FIG. 1. The image information from the external device is an example of first image information. In the example shown in FIG. 1, the installation site of the screen SC is, for example, a wall. However, this is not limiting. For example, a floor, table or the like may be used. The installation site of the display device 10 is, for example, a ceiling. However, this is not limiting. A wall, floor, table, dedicated installation stand or the like may be used.

The display device 10 has an OSD function to display, on the screen SC, a second image G2 which is an OSD image based on OSD image information. The OSD image information is an example of second image information. In the example shown in FIG. 1, the second image G2 is a menu image including items of image quality setting, display setting, and custom setting. The form of the second image G2 is not limited to the example shown in FIG. 1.

The display device 10 can display the second image G2 as superimposed on the first image G1 in the state where the first image G1 is displayed on the screen SC. The display device 10 can also display the second image G2 alone in the state where the first image G1 is not displayed on the screen SC. The example shown in FIG. 1 is the state where the first image G1 and the second image G2 superimposed thereon are displayed on the screen SC, as a third image G3. That is, in FIG. 1, the menu image, which is an OSD image, is displayed in a superimposed state on the screen SC.

2. CONFIGURATION OF DISPLAY DEVICE

Figure 2:
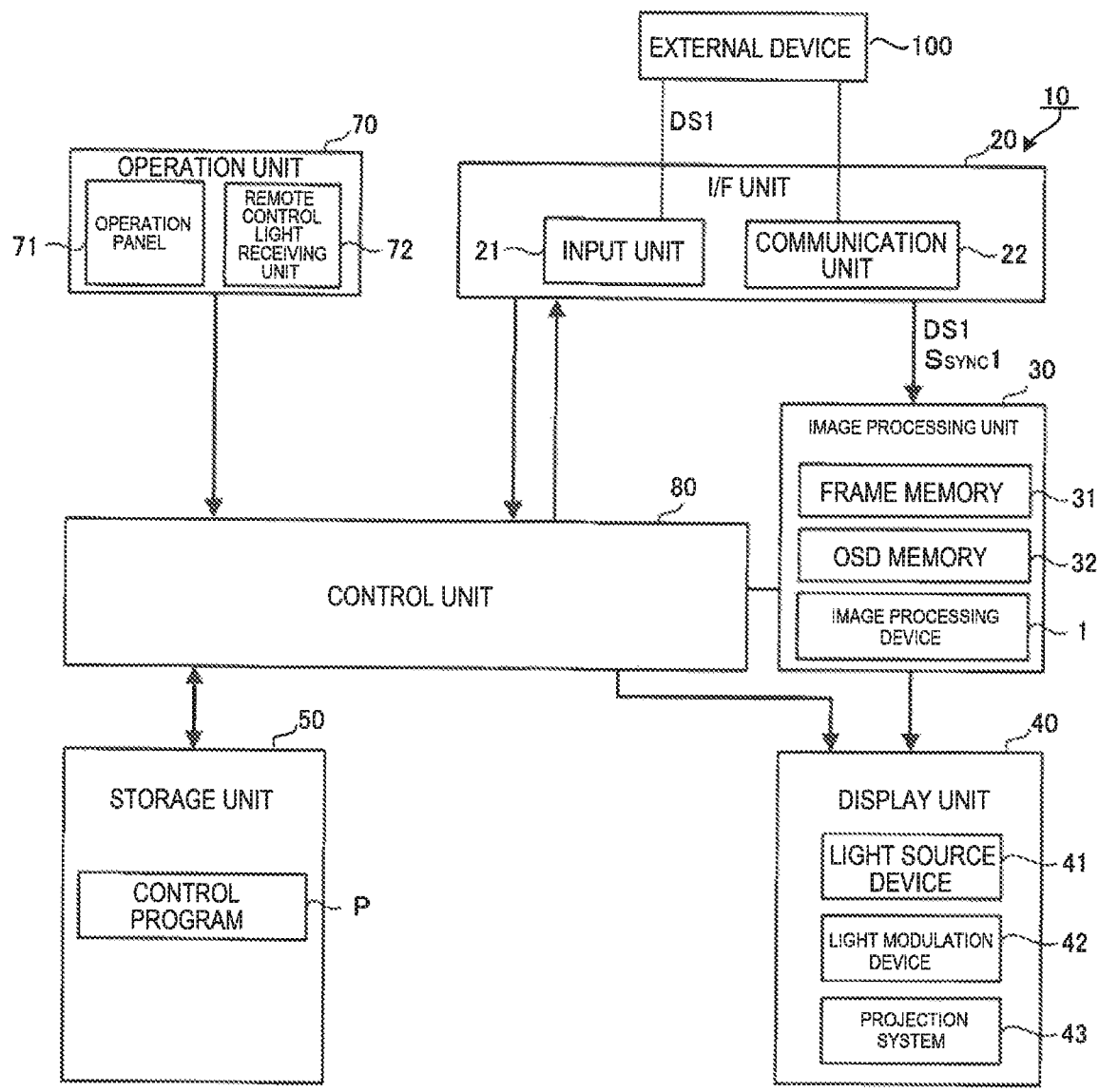
FIG. 2 is a block diagram showing the display device according to the embodiment.

FIG. 2 is a block diagram showing the display device 10 according to the embodiment. The display device 10 has an I/F (interface) unit 20, an image processing unit 30, a display unit 40, a storage unit 50, an operation unit 70, and a control unit 80, as shown in FIG. 2.

As an interface that can be coupled to an external device 100, I/F unit 20 has an input unit 21 and a communication unit 22. The external device 100 is a device supplying first image information DS1 to the display device 10. The external device 100 is, for example, a personal computer or DVD (digital versatile disk) player or the like. The first image information DS1 is image information about the first image G1. This image information is represented by a video signal including a signal to take a timing in a vertical direction when drawing an image, that is, a vertical synchronization signal, and a signal to take a timing in a horizontal direction, that is, a horizontal synchronization signal. The I/F unit 20 may be arranged in the same casing as the main body of the display device 10 or may be arranged in a different casing from the casing of the main body of the display device 10.

The input unit 21 can take in the first image information DS1 from the external device 100. Specifically, the input unit 21 is, for example, a D-sub or HDMI interface or the like. The number of input units 21 may be plural. In such a case, the input units 21 may employ the same standard or different standards from each other. The input unit 21 may be any interface that can take in the first image information DS1 from the external device 100. For example, the input unit 21 may be a wireless interface such as Wi-Fi or Bluetooth, or may be coupled to the external device 100 via a LAN (local area network), the internet or the like. HDMI, Wi-Fi, and Bluetooth are trademarks registered.

The communication unit 22 can be coupled in such a way as to be able to communicate with the external device 100. Specifically, the communication unit 22 is, for example, a wired interface such as USB. The number of communication units 22 may be plural. In such a case, the communication units 22 may employ the same standard or different standards from each other. The communication unit 22 may be provided according to need and may be omitted.

The image processing unit 30 is a circuit performing necessary processing of the first image information DS1 and inputting the processed first image information DS1 to the display unit 40. The image processing unit 30 has an image processing device 1, a frame memory 31, and an OSD memory 32. The image processing unit 30 loads the first image information DS1 from the I/F unit 20 into the frame memory 31, executes various kinds of processing such as resolution conversion, resizing, and distortion correction according to need, and inputs the processed first image information DS1 to the display unit 40. In the OSD memory 32, second image information DS2 used to display the second image G2 is stored. The second image information DS2 is inputted to the image processing device 1. The image processing device 1 may be configured as an OSD superimposing circuit that provides an OSD function using the second image information DS2. The image processing device 1 will be described in detail later.

The display unit 40 is a projection device projecting image light onto the screen SC as a display surface and displaying the first image G1, the second image G2, and the third image G3. The display unit 40 has a light source device 41, a light modulation device 42, and a projection system 43.

Figure 3:
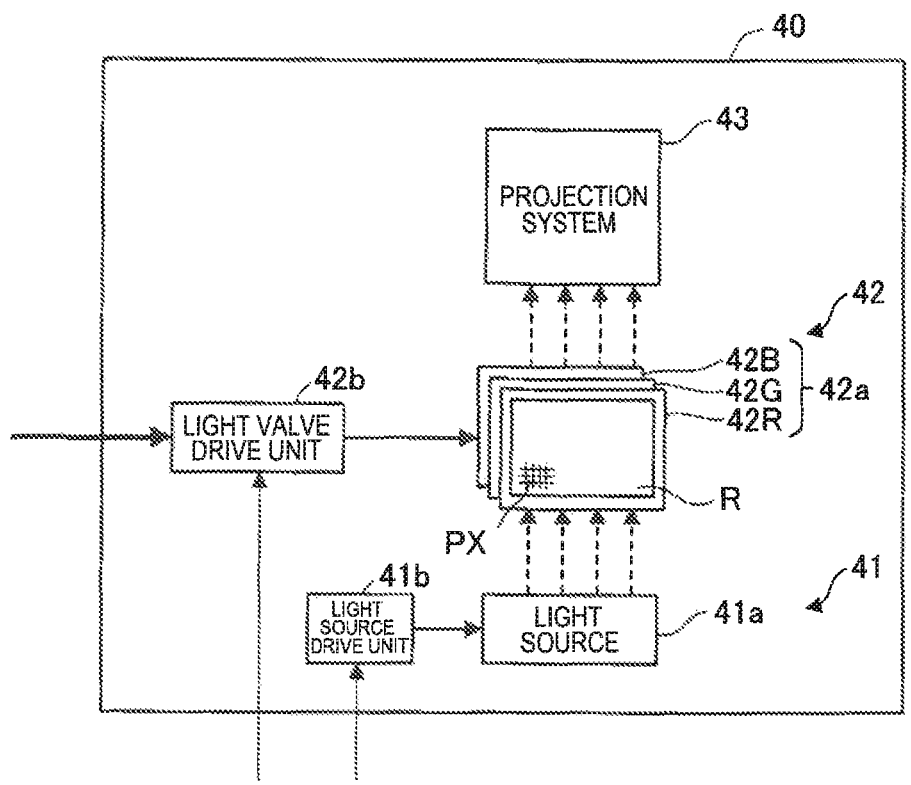
FIG. 3 shows an example of a display unit of the display device according to the embodiment.

FIG. 3 shows an example of the display unit 40 of the display device 10 according to the embodiment. As shown in FIG. 3, the light source device 41 has a light source 41*a* and a light source drive unit 41*b*. The light source 41*a* includes, for example, a halogen lamp, xenon lamp, ultra-high-pressure mercury lamp, LED (light-emitting diode), or laser light source or the like. The light source drive unit 41*b* is a drive circuit driving the light source 41*a*.

The light modulation device 42 has light valves 42R, 42G, and 42B, and a light valve drive unit 42*b*. The light valves 42R, 42G, and 42B are liquid crystal light valves for red, green, and blue, respectively. The light valve drive unit 42*b* is a drive circuit driving the light valves 42R, 42G, and 42B, based on an image signal outputted from the image processing unit 30. Hereinafter, when there is no need to distinguish the light valves 42R, 42G, and 42B from each other, each of the light valves 42R, 42G, and 42B is simply referred to as a "light valve 42*a*".

The light valve 42*a* is formed of a liquid crystal panel having a pair of transparent substrates with a liquid crystal provided between them, or the like. The light valve 42*a* has a rectangular pixel area R including a plurality of pixels PX located in the form of a matrix. In the light valve 42*a*, a drive voltage can be applied to the liquid crystal, pixel PX by pixel PX. As the light valve drive unit 42*b* applies, to each pixel PX, a drive voltage based on RGB image data inputted from the image processing unit 30, each pixel PX is set to a light transmittance based on the drive voltage. Therefore, the light emitted from the light source 41*a* is modulated by passing through the pixel area R. Image light based on the RGB image data is thus generated for each color.

The application of the drive voltage to each pixel PX of the light valve 42*a* is performed in such a way as to draw an image horizontally from the top left to the top right of the screen, then go down by one line on reaching the right end, and draw an image from left to right again. On reaching the bottom right of the screen, the application of the drive voltage returns to the top left and similar scanning is repeated from there. The timing of moving from the bottom right to the top left of the screen is decided by a vertical synchronization signal. The timing of moving from the right end of the upper line to the left end of the lower line is decided by a horizontal synchronization signal. Each of the light valves 42R, 42G, and 42B is not limited to a transmission-type liquid crystal panel and may be, for example, a reflection-type liquid crystal panel or DMD (digital mirror device) or the like.

The image light of the respective colors generated by the light modulation device 42 is combined together into full-color image light by a light combining system, not illustrated. The projection system 43 projects the full-color image light to form an image on the screen SC. The projection system 43 is an optical system including at least one projection lens and may include a zoom lens or a focus lens or the like.

Back to FIG. 2, the storage unit 50 is a storage device storing a control program P executed by the control unit 80 and data processed by the control unit 80. The storage unit 50 is formed of, for example, a hard disk drive or semiconductor memory. The storage unit 50 may be provided in a storage device outside the display device 10 or at a server or the like.

The operation unit 70 has an operation panel 71 and a remote control light receiving unit 72. The operation panel 71 is provided at an outer casing of the display device 10 and is configured to be able to accept an operation by the user. The operation panel 71 outputs a signal based on an operation by the user. The remote control light receiving unit 72 receives an infrared signal from a remote controller, not illustrated, then decodes the infrared signal, and outputs a signal based on an operation on the remote controller.

The control unit 80 has a function of controlling each part of the display device 10 and a function of processing various data. The control unit 80 includes, for example, a CPU (central processing unit) or the like. The control unit 80 executes the control program P stored in the storage unit 50 and thus implements various functions. The control unit 80 may be formed of a single processor or a plurality of processors. A part or all of the functions of the control unit 80 may be implemented by hardware such as a DSP (digital signal processor), ASIC (application-specific integrated circuit), PLD (programmable logic device), or FPGA (field-programmable gate array).

3. IMAGE PROCESSING DEVICE

Figure 4:
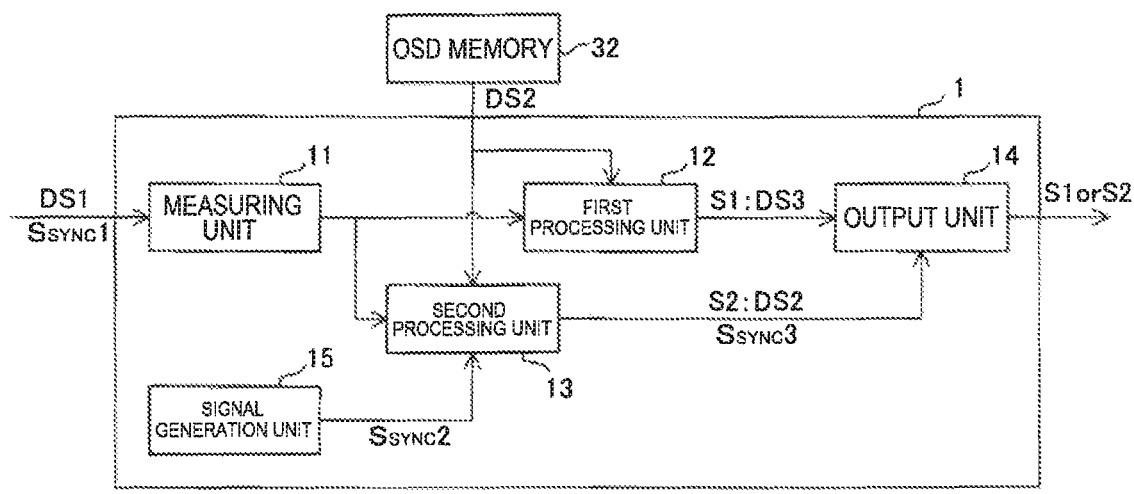
FIG. 4 is a block diagram showing an image processing device according to the embodiment.

FIG. 4 is a block diagram showing the image processing device 1 according to the embodiment. As shown in FIG. 4, the image processing device 1 has a measuring unit 11, a first processing unit 12, a second processing unit 13, an output unit 14, and a signal generation unit 15.

The measuring unit 11 is a circuit that measures the state of a first synchronization signal SSYNC1 included in a video signal inputted from the I/F unit 20, which is the circuit preceding the image processing device 1. For example, the measuring unit 11 includes a counter circuit. The state of the first synchronization signal SSYNC1 measured by the measuring unit 11 may be, for example, the type of the standard of the first synchronization signal SSYNC1, the period and amplitude of a first vertical synchronization signal VSYNC1 or a first horizontal synchronization signal HSYNC1 included in the first synchronization signal SSYNC1, or the like. In this embodiment, the measuring unit 11 measures the period of the first vertical synchronization signal VSYNC1 and outputs the result of the measurement. To the measuring unit 11, the first image information DS1 included in the video signal from the I/F unit 20 is inputted in addition to the first synchronization signal SSYNC1. The output from the measuring unit 11 includes not only the result of the measurement but also the first vertical synchronization signal VSYNC1 and the first image information DS1.

The first processing unit 12 is a circuit that combines together the first image information DS1 inputted from the measuring unit 11 and the second image information DS2 inputted from the OSD memory 32 to generate third image information DS3 and that outputs a first signal S1 including the third image information DS3. To the first processing unit 12, the first synchronization signal SSYNC1 from the measuring unit 11 is inputted in addition to the first image information DS1 and the second image information DS2. The first processing unit 12 outputs the first signal S1 including the third image information DS3 synchronously with the first synchronization signal SSYNC1.

The second processing unit 13 is a circuit that outputs a second signal S2 including the second image information DS2 alone inputted from the OSD memory 32, without combining the second image information DS2 with the first image information DS1. To the second processing unit 13, the first synchronization signal SSYNC1 from the measuring unit 11 is inputted in addition to the second image information DS2. Also, a second synchronization signal SSYNC2 from the signal generation unit 15 is inputted to the second processing unit 13.

The second processing unit 13 can switch the second signal S2 between a first state where the second signal S2 is outputted synchronously with the first synchronization signal SSYNC1 and a second state where the second signal S2 is outputted synchronously with the second synchronization signal SSYNC2. The second processing unit 13 outputs an output synchronization signal SSYNC3 including an output vertical synchronization signal VSYNC3 and an output horizontal synchronization signal HSYNC3. The second processing unit 13 switches between the first state and the second state, based on the result of the measurement by the measuring unit 11. Specifically, when the period of the first vertical synchronization signal VSYNC1 is within a predetermined range, based on the result of the measurement by the measuring unit 11, the second processing unit 13 sets the first state. Otherwise, the second processing unit 13 sets the second state. The second processing unit 13 also decides a setting in the first state, based on the result of the measurement by the measuring unit 11. Specifically, in the first state, when a change in the period of the first vertical synchronization signal VSYNC1 is equal to or greater than a predetermined value, based on the result of the measurement by the measuring unit 11, the second processing unit 13 uses an H-locked mode in which the period of the output horizontal synchronization signal HSYNC3 is fixed to a period equal to a period HPERIOD2 of a second horizontal synchronization signal HSYNC2 of the second synchronization signal SSYNC2. Otherwise, the second processing unit 13 uses a V-locked mode in which the period of the output vertical synchronization signal VSYNC3 is fixed to a period equal to a period T of the first vertical synchronization signal VSYNC1 of the first synchronization signal SSYNC1.

The output unit 14 is a circuit to which the first signal S1 and the second signal S2 are inputted and which selects and outputs the first signal S1 or the second signal S2. For example, the output unit 14 includes a multiplexer. The display unit 40 displays a menu image as superimposed on an image of the video signal, based on the first signal S1 outputted from the output unit 14. The superimposed image is synchronized with the first synchronization signal SSYNC1. Also, the display unit 40 displays the menu image alone, based on the second signal S2 outputted from the output unit 14. In the first state, the menu image displayed alone is synchronized with the first synchronization signal SSYNC1. In the second state, the menu image displayed alone is synchronized with the second synchronization signal SSYNC2.

The signal generation unit 15 is a circuit that generates the second synchronization signal SSYNC2 of a different system from the first synchronization signal SSYNC1. For example, the signal generation unit 15 includes an oscillator such as a quartz crystal oscillator and generates the second synchronization signal SSYNC2, based on an oscillation signal from the oscillator.

Figure 5:
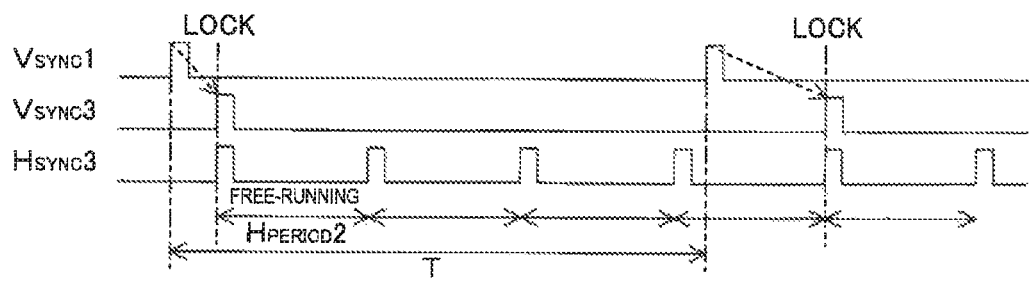
FIG. 5 shows the timing of an output vertical synchronization signal and an output horizontal synchronization signal in an H-locked mode in a first state of a second processing unit.

FIG. 5 shows the timing of the output vertical synchronization signal VSYNC3 and the output horizontal synchronization signal HSYNC3 in the H-locked mode in the first state of the second processing unit 13. In the H-locked mode, the output horizontal synchronization signal HSYNC3 is synchronized with the second horizontal synchronization signal HSYNC2, which is the horizontal synchronization signal of the second synchronization signal SSYNC2, as shown in FIG. 5. Therefore, the period of the output horizontal synchronization signal HSYNC3 is equal to the period HPERIOD2 of the second horizontal synchronization signal HSYNC2. Also, the output vertical synchronization signal VSYNC3 is synchronized with the initial second horizontal synchronization signal HSYNC2 after the first vertical synchronization signal VSYNC1. A predetermined number of output horizontal synchronization signals HSYNC3 is outputted with the period HPERIOD2.

Figure 6:
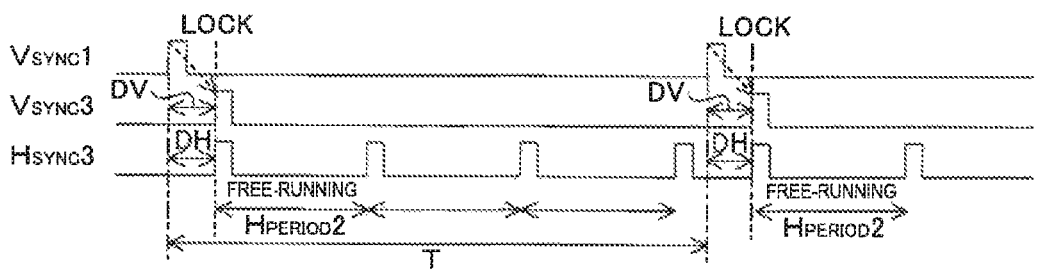
FIG. 6 shows the timing of an output vertical synchronization signal and an output horizontal synchronization signal in a V-locked mode in the first state of the second processing unit.

FIG. 6 shows the timing of the output vertical synchronization signal VSYNC3 and the output horizontal synchronization signal HSYNC3 in the V-locked mode in the first state of the second processing unit 13. In the V-locked mode, the output vertical synchronization signal VSYNC3 is synchronized with the first vertical synchronization signal VSYNC1, which is the vertical synchronization signal of the first synchronization signal SSYNC1, as shown in FIG. 6. The output horizontal synchronization signal HSYNC3 is synchronized with the second horizontal synchronization signal HSYNC2. However, the timing of the second horizontal synchronization signal HSYNC2 is reset synchronously with the first vertical synchronization signal VSYNC1. In this case, a predetermined number of output horizontal synchronization signals HSYNC3 may not be outputted with the period HPERIOD2.

Figure 7:
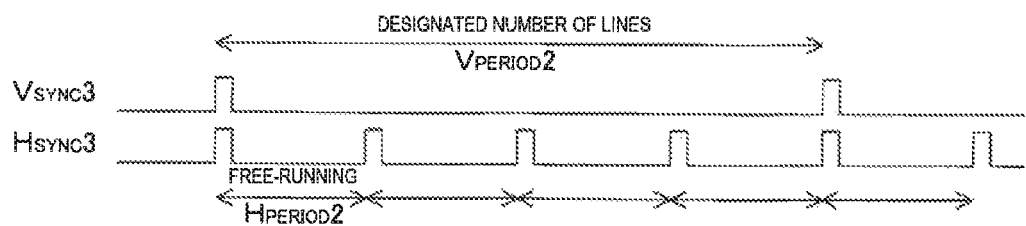
FIG. 7 shows the timing of an output vertical synchronization signal and an output horizontal synchronization signal in a second state of the second processing unit.

FIG. 7 shows the timing of the output vertical synchronization signal VSYNC3 and the output horizontal synchronization signal HSYNC3 in the second state of the second processing unit 13. In the second state, the output horizontal synchronization signal HSYNC3 is synchronized with the second horizontal synchronization signal HSYNC2, which is the horizontal synchronization signal of the second synchronization signal SSYNC2, as shown in FIG. 7. Also, the output vertical synchronization signal VSYNC3 is synchronized with a second vertical synchronization signal VSYNC2, which is the vertical synchronization signal of the second synchronization signal SSYNC2.

Figure 8:
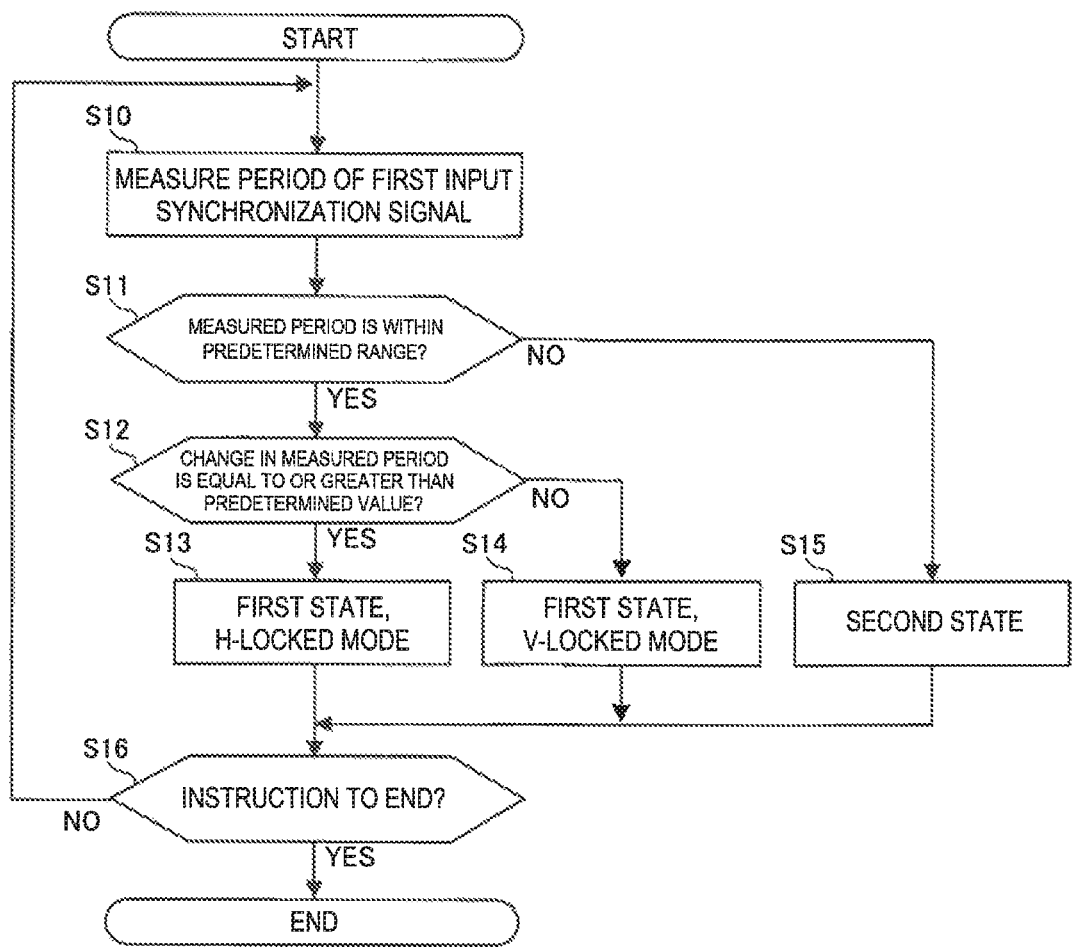
FIG. 8 is a flowchart showing a switching operation between the first state and the second state of the second processing unit.

FIG. 8 is a flowchart showing a switching operation between the first state and the second state of the second processing unit 13. As shown in FIG. 8, in the image processing device 1, first in step S10, the measuring unit 11 measures the period of the first synchronization signal SSYNC1, more specifically, the period of the first vertical synchronization signal VSYNC1.

Next, in step S11, the second processing unit 13 determines whether the measured period is within a predetermined range or not. When the measured period is not within the predetermined range, the second processing unit 13 sets the second state in step S15. Meanwhile, when the measured period is within the predetermined range, the second processing unit 13 in step S12 determines whether a change in the measured period is equal to or greater than a predetermined value, or not.

When the change in the measured period is equal to or greater than the predetermined value, the second processing unit 13 in step S13 sets the first state and the H-locked mode. Meanwhile, when the change in the measured period is less than the predetermined value, the second processing unit 13 in step S14 sets the first state and the V-locked mode.

As described above, the second processing unit 13 is either in the first state or in the second state. In step S16, the second processing unit 13 determines whether an instruction to end is given or not. When the instruction to end is not given, the second processing unit 13 returns to step S10. Meanwhile, when the instruction to end is given, the second processing unit 13 ends the processing.

Figure 9:
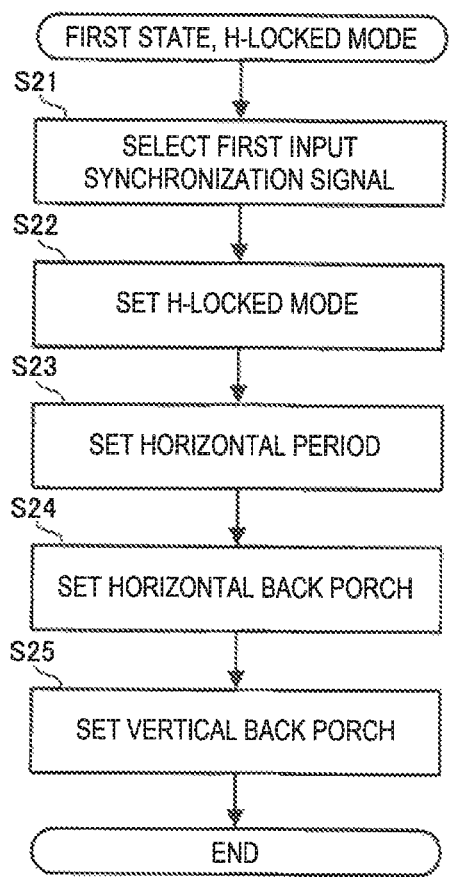
FIG. 9 is a flowchart showing a flow of setting the H-locked mode in the first state of the second processing unit.

FIG. 9 is a flowchart showing a flow of setting the H-locked mode in the first state of the second processing unit 13. In the H-locked mode, as shown in FIG. 9, first in step S21, the first synchronization signal SSYNC1 is selected as a synchronization signal used to generate the output synchronization signal SSYNC3. Next, in step S22, a setting to synchronize the output vertical synchronization signal VSYNC3 with the output horizontal synchronization signal HSYNC3 is made. Next, in step S23, the period of the second horizontal synchronization signal HSYNC2 of the second synchronization signal SSYNC2 is set. Next, in step S24, the back porch of the output horizontal synchronization signal HSYNC3 is set. Next, in step S25, the back porch of the output vertical synchronization signal VSYNC3 is set. This completes the setting of the first state using the H-locked mode. The order of steps S21 to S25 is not limited to the order shown in FIG. 9 and is arbitrarily decided.

Figure 10:
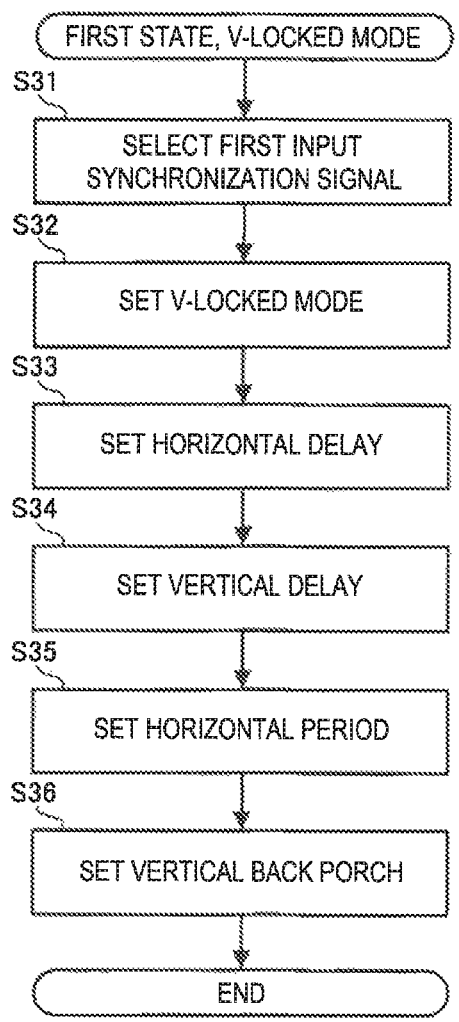
FIG. 10 is a flowchart showing a flow of setting the V-locked mode in the first state of the second processing unit.

FIG. 10 is a flowchart showing a flow of setting the V-locked mode in the first state of the second processing unit 13. In the V-locked mode, as shown in FIG. 10, first in step S31, the first synchronization signal SSYNC1 is selected as a synchronization signal used to generate the output synchronization signal SSYNC3. Next, in step S32, a setting to synchronize the output vertical synchronization signal VSYNC3 with the first vertical synchronization signal VSYNC1 is made. Next, in step S33, a delay time DH of the output horizontal synchronization signal HSYNC3 from the first vertical synchronization signal VSYNC1 is set. Next, in step S34, a delay time DV of the output vertical synchronization signal VSYNC3 from the first vertical synchronization signal VSYNC1 is set. Next, in step S35, the period of the second horizontal synchronization signal HSYNC2 of the second synchronization signal SSYNC2 is set. Next, in step S36, the back porch of the output vertical synchronization signal VSYNC3 is set. This completes the setting of the first state using the V-locked mode. The order of steps S31 to S36 is not limited to the order shown in FIG. 10 and is arbitrarily decided.

Figure 11:
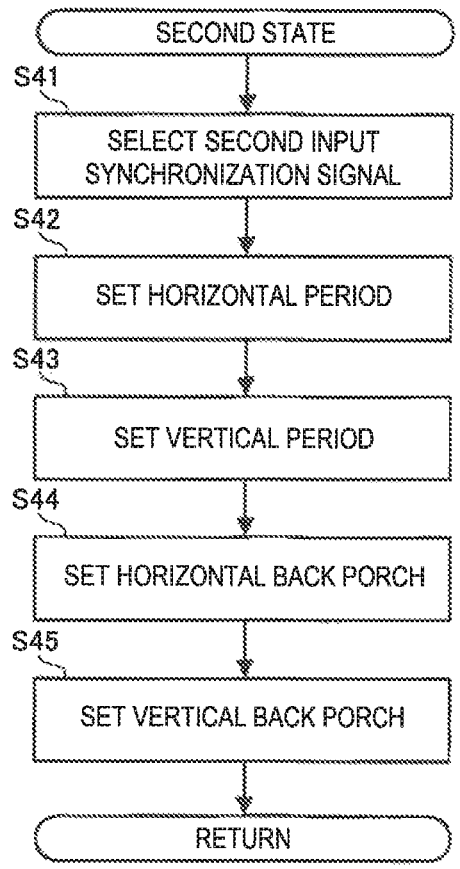
FIG. 11 is a flowchart showing a flow of setting in the second state of the second processing unit.

FIG. 11 is a flowchart showing a flow of setting in the second state of the second processing unit 13. In the second state, as shown in FIG. 11, first in step S41, the second synchronization signal SSYNC2 is selected as a synchronization signal used to generate the output synchronization signal SSYNC3. Next, in step S42, the period of the second horizontal synchronization signal HSYNC2 of the second synchronization signal SSYNC2 is set. Next, in step S43, the period of the second vertical synchronization signal VSYNC2 of the second synchronization signal SSYNC2 is set. Next, in step S44, the back porch of the output horizontal synchronization signal HSYNC3 is set. Next, in step S45, the back porch of the output vertical synchronization signal VSYNC3 is set. This completes the setting of the second state. The order of steps S41 to S45 is not limited to the order shown in FIG. 11 and is arbitrarily decided.

As described above, the display device 10 has the image processing device 1 and the display unit 40 displaying an image using the first signal or the second signal outputted from the output unit 14 of the image processing device 1. In the display device 10, the image processing device 1 has the following effects.

As described above, the image processing device 1 has the first processing unit 12, the second processing unit 13, and the output unit 14. The first processing unit 12 outputs the first signal S1 including the third image information about the third image G3, which is a combined image of the first image G1 and the second image G2, synchronously with the first synchronization signal SSYNC1, using the first image information DS1 about the first image G1 and the second image information DS2 about the second image G2. The second processing unit 13 outputs the second signal S2 including the second image information DS2, switching between the first state, where the second signal S2 is synchronized with the first synchronization signal SSYNC1, and the second state, where the second signal S2 is synchronized with the second synchronization signal SSYNC2 different from the first synchronization signal SSYNC1, based on the state of the first synchronization signal SSYNC1. The output unit 14 takes in the first signal S1 and the second signal S2 and selects and outputs the first signal S1 or the second signal S2.

In an image processing method used for the image processing device 1, the first signal S1 is outputted synchronously with the first synchronization signal SSYNC1, using the first image information DS1 and the second image information DS2. The second signal S2 is outputted, switching between the first state, where the second signal S2 is synchronized with the first synchronization signal SSYNC1, and the second state, where the second signal S2 is synchronized with the second synchronization signal SSYNC2, based on the state of the first synchronization signal SSYNC1. The first signal S1 or the second signal S2 is selected and outputted.

In the image processing device 1 or the image processing method, when the state of the first synchronization signal SSYNC1 fluctuates or the like, the second signal S2 can be synchronized with the second synchronization signal SSYNC2 different from the first synchronization signal SSYNC1. Since the second synchronization signal SSYNC2 is different from the first synchronization signal SSYNC1, a synchronization signal having less fluctuation or the like than the first synchronization signal SSYNC1 can be used as the second synchronization signal SSYNC2. This can reduce an inconvenience such as tearing of the second image G2 displayed using the second signal S2, compared with when the second signal S2 is synchronized with the first synchronization signal SSYNC1.

When the state of the first synchronization signal SSYNC1 has no fluctuation or the like, the second signal S2 can be synchronized with the first synchronization signal SSYNC1. Since the state of the first synchronization signal SSYNC1 has no fluctuation or the like, an inconvenience such as tearing of the second image G2 displayed using the second signal S2 can be reduced. Also, since the second signal S2 is synchronized with the first synchronization signal SSYNC1 similarly to the first signal S1, the second image G2 can continue being displayed while reducing an inconvenience such as tearing, even when switching from the state where the output unit 14 selects the first signal S1 to the state where the output unit 14 selects the second signal S2.

The image processing device 1 has the measuring unit 11 measuring the state of the first synchronization signal SSYNC1. The second processing unit 13 switches between the first state and the second state, based on the result of the measurement by the measuring unit 11. Therefore, the state of the first synchronization signal SSYNC1 can be determined, based on the result of the measurement by the measuring unit 11, and the second processing unit 13 can be switched to the first state or the second state, based on the result of the determination.

In the embodiment, the second processing unit 13 sets the second state when the first synchronization signal SSYNC1 is not detected, based on the result of the measurement by the measuring unit 11. Therefore, even when the first synchronization signal SSYNC1 is not inputted, the second image G2 can be displayed using the second signal S2.

The first synchronization signal SSYNC1 includes the first vertical synchronization signal VSYNC1. The measuring unit 11 measures the period T of the first vertical synchronization signal VSYNC1 as the state of the first synchronization signal SSYNC1. Thus, the fluctuation or the like of the first synchronization signal SSYNC1 can be properly determined, based on the result of the measurement by the measuring unit 11.

The second synchronization signal SSYNC2 includes the second horizontal synchronization signal HSYNC2. In the first state, when a change in the period T of the first vertical synchronization signal VSYNC1 is equal to or greater than a predetermined value, the second processing unit 13 outputs the output horizontal synchronization signal HSYNC3 as a horizontal synchronization signal having a period equal to the period HPERIOD2 of the second horizontal synchronization signal HSYNC2. In this case, the fluctuation or the like of the output vertical synchronization signal VSYNC3 of the second signal S2 can be reduced, compared with a configuration where a vertical synchronization signal having a period equal to the period T of the first vertical synchronization signal VSYNC1 is outputted. In the first state, when a change in the period T of the first vertical synchronization signal VSYNC1 is less than the predetermined value, the second processing unit 13 outputs the output vertical synchronization signal VSYNC3 as a vertical synchronization signal having a period equal to the period T of the first vertical synchronization signal VSYNC1. In this case, the fluctuation or the like of the output vertical synchronization signal VSYNC3 and the output horizontal synchronization signal HSYNC3 of the second signal S2 can be reduced, compared with a configuration where a horizontal synchronization signal having a period equal to the period HPERIOD2 of the second horizontal synchronization signal HSYNC2 is outputted.

4. MODIFICATION EXAMPLES

The image processing device, the display device, and the image processing method according to the disclosure have been described above, based on the illustrated embodiment. However, the disclosure is not limited to those described in the embodiment. The configuration of each part of the disclosure can be replaced by an arbitrary configuration that achieves a function similar to that in the embodiment, and an arbitrary configuration can be added thereto. According to the disclosure, arbitrary configurations in the following modification examples may be combined together.

4-1. Modification Example 1

In the embodiment, the case where the display device 10 is a projector is described as an example. However, the display device according to the disclosure is not limited to a projector and may be, for example, a touch-panel display device. The configuration of the circuit or the like coupled to the image processing device 1 is not limited to that in the embodiment, either.

Figure 12:
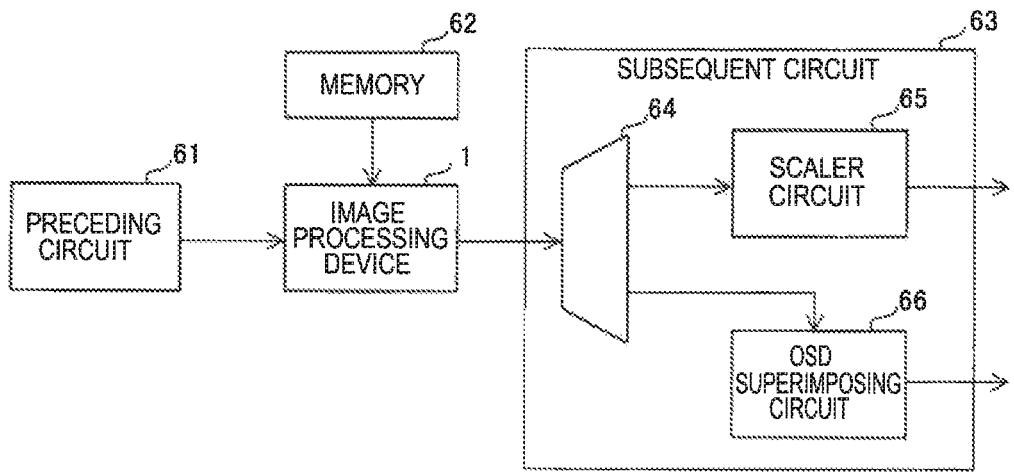
FIG. 12 is a block diagram showing an example of coupling of the image processing device according to Modification Example 1.

FIG. 12 is a block diagram showing an example of coupling of the image processing device 1 according to Modification Example 1. A preceding circuit 61, a memory 62, and a subsequent circuit 63 are coupled to the image processing device 1 shown in FIG. 12. The memory 62 corresponds to the OSD memory 32. The preceding circuit 61 is a circuit inputting the first synchronization signal SSYNC1 and the first image information DS1 to the image processing device 1. The preceding circuit 61 is, for example, an image processing circuit arranged between the I/F unit 20 and the image processing device 1. For example, this image processing circuit converts image information in various formats inputted from the I/F unit 20 into image information representing the gradation level of each pixel of the light valves 42R, 42G, and 42B. Also, this image processing circuit performs image quality adjustment processing or the like to adjust the brightness, contrast, sharpness, color tone and the like of the converted image information, based on an instruction from the control unit 80.

The memory 62 is a circuit inputting the second image information DS2 to the image processing device 1. The memory 62 includes, for example, a DRAM (dynamic random access memory). The subsequent circuit 63 has a distribution unit 64, a scaler circuit 65, and an OSD superimposing circuit 66. The distribution unit 64 distributes the first signal S1 or the second signal S2 from the image processing device 1 to the scaler circuit 65 and the OSD superimposing circuit 66. The distribution unit 64 is, for example, a demultiplexer. The scaler circuit 65 performs processing to increase the resolution of the image information included in the first signal S1 or the second signal S2. The OSD superimposing circuit 66 combines the image information included in the first signal S1 or the second signal S2 with another OSD information and outputs the combined image information.

4-2. Modification Example 2

Figure 13:
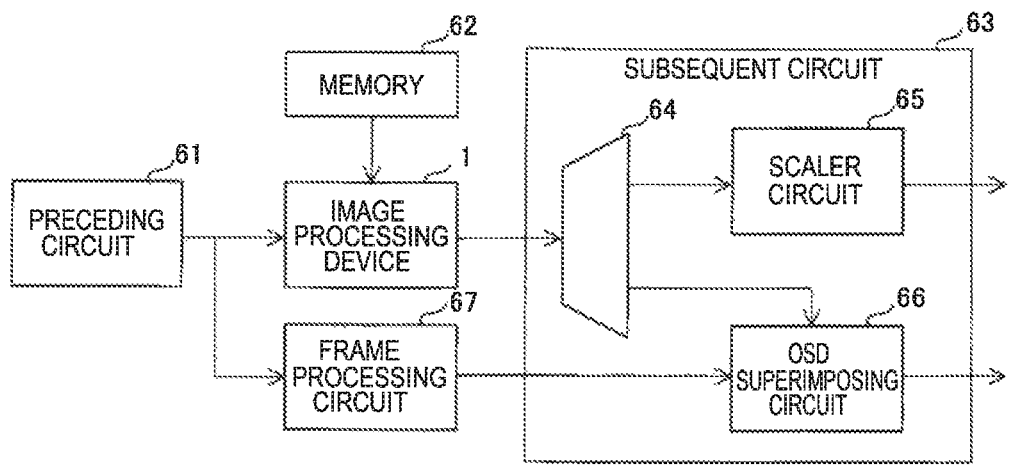
FIG. 13 is a block diagram showing an example of coupling of the image processing device according to Modification Example 2.

FIG. 13 is a block diagram showing an example of coupling of the image processing device 1 according to Modification Example 2. The example of coupling according to Modification Example 2 shown in FIG. 13 is the same as the example of coupling according to the foregoing Modification Example 1 except that a frame processing circuit 67 is coupled to the image processing device 1 shown in FIG. 13, in addition to the preceding circuit 61, the memory 62, and the subsequent circuit 63. The frame processing circuit 67 performs, for example, processing to generate an intermediate frame from the first image information DS1 from the preceding circuit 61 and insert the intermediate frame between frames of the first image information DS1. In Modification Example 2 shown in FIG. 13, the OSD superimposing circuit 66 combines together the image information included in the second signal S2 and the first image information DS1 from the frame processing circuit 67 and outputs the combined image information.

4-3. Modification Example 3

Figure 14:
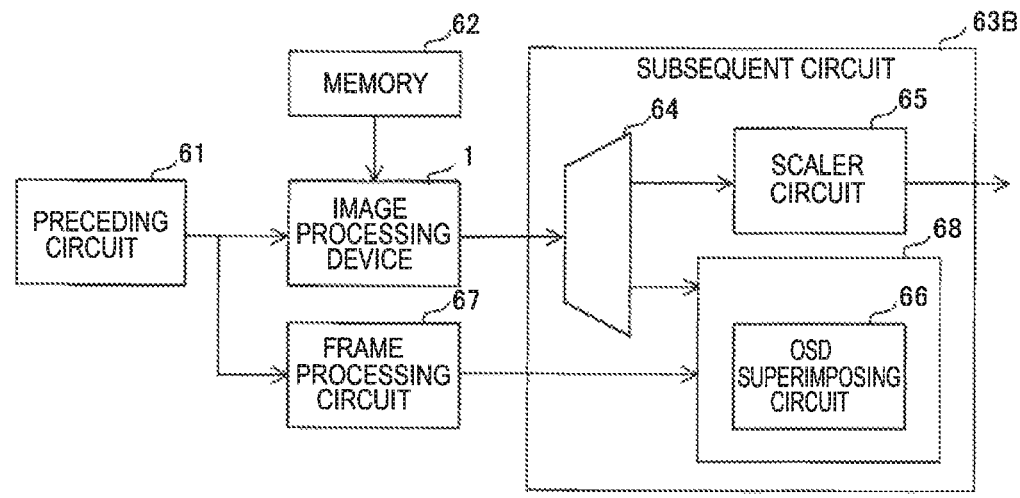
FIG. 14 is a block diagram showing an example of coupling of the image processing device according to Modification Example 3.

FIG. 14 is a block diagram showing an example of coupling of the image processing device 1 according to Modification Example 3. The example of coupling according to Modification Example 3 shown in FIG. 14 is the same as the example of coupling according to the foregoing Modification Example 2 except that a subsequent circuit 63B is provided instead of the subsequent circuit 63. The subsequent circuit 63B is similar to the foregoing subsequent circuit 63 except that the OSD superimposing circuit 66 is provided within a circuit 68. In Modification Example 3 shown in FIG. 14, the circuit 68 performs predetermined processing of the image information included in the second signal S2 and the first image information DS1 from the frame processing circuit 67 and subsequently inputs the processed image information to the OSD superimposing circuit 66.

What is claimed is:

1. An image processing device comprising:
   a first processing unit outputting a first signal including third image information about a third image which is a combined image of a first image and a second image, by using first image information about the first image and second image information about the second image included in an input signal, and synchronously with a first synchronization signal included in the input signal;
   a second processing unit outputting a second signal including the second image information, switching between a first state where the second signal is synchronized with the first synchronization signal and a second state where the second signal is synchronized with a second synchronization signal different from the first synchronization signal, based on a state of the first synchronization signal; and
   an output unit having the first signal and the second signal inputted and selecting and outputting the first signal or the second signal.

2. The image processing device according to claim 1, further comprising
   a measuring unit measuring the state of the first synchronization signal, wherein
   the second processing unit switches between the first state and the second state, based on a result of measurement by the measuring unit.

3. The image processing device according to claim 2, wherein
   the second processing unit sets the second state when the first synchronization signal is not detected, based on the result of measurement by the measuring unit.

4. The image processing device according to claim 2, wherein
   the first synchronization signal includes a first vertical synchronization signal, and
   the measuring unit measures a period of the first vertical synchronization signal as the state of the first synchronization signal.

5. The image processing device according to claim 4, wherein the second synchronization signal includes a second horizontal synchronization signal, and the second processing unit, in the first state, outputs a horizontal synchronization signal having a period equal to a period of the second horizontal synchronization signal when a change in the period of the first vertical synchronization signal is equal to or greater than a predetermined value, and outputs a vertical synchronization signal having a period equal to the period of the first vertical synchronization signal when the change in the period of the first vertical synchronization signal is less than the predetermined value.

6. The image processing device according to claim 1, further comprising a signal generation unit generating the second synchronization signal.

7. The image processing device according to claim 1, wherein the second image is an OSD image.

8. A display device comprising:

the image processing device according to claim 1; and a display unit displaying an image, using the first signal or the second signal outputted from the output unit.

9. An image processing method comprising:

outputting a first signal including third image information about a third image which is a combined image of a first image and a second image, by using first image information about the first image and second image information about the second image included in an input signal, and synchronously with a first synchronization signal included in the input signal;

outputting a second signal including the second image information, switching between a first state where the second signal is synchronized with the first synchronization signal and a second state where the second signal is synchronized with a second synchronization signal different from the first synchronization signal, based on a state of the first synchronization signal; and selecting and outputting the first signal or the second signal.

10. The image processing method according to claim 9, wherein the state of the first synchronization signal is measured, and switching between the first state and the second state is performed, based on a result of measurement of the state of the first synchronization signal.

11. The image processing method according to claim 10, wherein the second state is set when the first synchronization signal is not detected, based on the result of measurement.

12. The image processing method according to claim 10, wherein the first synchronization signal includes a first vertical synchronization signal, and a period of the first vertical synchronization signal is measured as the state of the first synchronization signal.

13. The image processing method according to claim 12, wherein the second synchronization signal includes a second horizontal synchronization signal, and in the first state, a horizontal synchronization signal having a period equal to a period of the second horizontal synchronization signal is outputted when a change in the period of the first vertical synchronization signal is equal to or greater than a predetermined value, and a vertical synchronization signal having a period equal to the period of the first vertical synchronization signal is outputted when the change in the period of the first vertical synchronization signal is less than the predetermined value.

14. The image processing method according to claim 9, wherein the second synchronization signal is generated.

15. The image processing method according to claim 9, wherein the second image is an OSD image.

* * * * *